United States Patent
Gamble et al.

(10) Patent No.: US 6,702,526 B2
(45) Date of Patent: Mar. 9, 2004

(54) CUTTING TOOL

(75) Inventors: Kevin M. Gamble, Stahlstown, PA (US); Thomas J. Long, II, Greensburg, PA (US); Georg H. Wellein, Hoechstadt (DE)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/134,328

(22) Filed: Apr. 29, 2002

(65) Prior Publication Data

US 2003/0202848 A1 Oct. 30, 2003

(51) Int. Cl.[7] .......................... B26D 1/12; B23P 15/28; B23G 5/00
(52) U.S. Cl. .......................... 407/36; 407/93; 408/173
(58) Field of Search .......................... 407/36, 37, 38, 407/40, 44, 45, 46, 93; 408/153, 173

(56) References Cited

U.S. PATENT DOCUMENTS

| | | | |
|---|---|---|---|
| 1,050,455 A | | 1/1913 | Harrold |
| 1,190,197 A | | 7/1916 | Shimer |
| 1,728,264 A | | 9/1929 | England |
| 2,021,188 A | | 11/1935 | Lovejoy |
| 3,343,431 A | | 9/1967 | Boyer |
| 3,802,043 A | * | 4/1974 | Garih .......................... 407/36 |
| 3,854,511 A | * | 12/1974 | Maier .......................... 144/230 |
| 4,309,132 A | * | 1/1982 | Adamson et al. .............. 407/38 |
| 4,364,290 A | * | 12/1982 | Astle .......................... 82/158 |
| 4,449,556 A | | 5/1984 | Colton |
| 4,547,100 A | * | 10/1985 | Naccarato et al. ............. 407/39 |
| 4,621,957 A | | 11/1986 | Dillard et al. |
| 4,927,301 A | * | 5/1990 | Reiterman ................... 408/180 |
| 4,936,717 A | * | 6/1990 | Bosek .......................... 407/31 |
| 5,031,491 A | * | 7/1991 | Hofmann ..................... 82/158 |
| 5,102,268 A | | 4/1992 | Mitchell |
| 5,167,473 A | | 12/1992 | Barnett |
| 5,395,186 A | | 3/1995 | Qvart |
| 5,667,343 A | * | 9/1997 | Hessman et al. ............. 407/36 |
| 5,735,649 A | | 4/1998 | Boscarino et al. |
| 5,788,426 A | | 8/1998 | Daniels |
| 5,800,079 A | | 9/1998 | Qvarth |
| 5,868,529 A | | 2/1999 | Rothballer et al. |
| 5,957,628 A | | 9/1999 | Bentjens et al. |
| 5,975,811 A | * | 11/1999 | Briese .......................... 407/40 |
| 6,004,080 A | | 12/1999 | Qvart et al. |
| 6,030,153 A | | 2/2000 | Votsch et al. |
| 6,086,290 A | | 7/2000 | Qvarth et al. |
| 6,176,648 B1 | | 1/2001 | Mizutani |
| 6,280,122 B1 | | 8/2001 | Qvarth |
| 6,354,772 B1 | * | 3/2002 | Mueller ....................... 408/152 |

OTHER PUBLICATIONS

Kennametal, Graphic of CNHU Milling Cutter.
Sanvik, Graphic of CoroKey Milling Cutter.
Ingersoll IMC, Graphic of Max–I Vario Slotting Cutter 45J9.
Walter, General Catalogue, "Tungsten Carbide Tools," printed in Austria 407 361–292 (09/99), 6 pages.
International Search Report mailed Aug. 8, 2003 in corresponding Application No. PCT/US03/13034.

\* cited by examiner

*Primary Examiner*—A. L. Wellington
*Assistant Examiner*—Brian D. Walsh
(74) *Attorney, Agent, or Firm*—Larry R. Meenan (57) ABSTRACT

A cutting tool comprises a cutter body having at least one pocket therein. The pocket is adapted to receive a cutting insert cartridge. A position-adjusting device cooperates with the cartridge to move the cartridge in opposing directions. The body may have a pocket for receiving the cartridge. The device may include a cylindrical body member supported in a fixed axial relation within a bore in the body. The cylindrical body member may have an eccentric protrusion that engages the cartridge. The cylindrical body member may be displaceable to displace the protrusion and move the cartridge. A clamping wedge may be provided for clamping the cartridge in the pocket. The protrusion may engage a slot in a rear surface of the cartridge. The protrusion may engage the slot.

15 Claims, 8 Drawing Sheets

CUTTING TOOL

BACKGROUND OF THE INVENTION

1. Field of the Invention

This invention generally relates to a cutting tool and more particularly to adjusting devices for rotating cutting tools for removing material from a workpiece. The invention is specifically concerned with a device for adjusting the position of the cutting edge of an insert mounted on the body of a milling cutter.

2. Description of the Related Art

Devices for adjusting the position of cutting inserts in milling cutters and other tools are known in the art. However, before such adjusting devices are described, a brief description of the mechanical context of such devices will be given.

In brief, a milling cutter is a rotary cutting tool having a cutter body with one or more circumferentially spaced recesses known as "pockets", into which are mounted cutting inserts. The cutting inserts intermittently engage a workpiece to remove material from the workpiece. Each insert is secured into its respective pocket by means of a clamping screw, which extends through a centrally located hole in the insert. While pockets and clamping screws provide a secure mount for the inserts during a cutting operation, they do not, unfortunately, provide a system operator with a suitable means for adjusting the relative position of the cutting edges of the inserts mounted in the pockets. For a more detailed description of a milling cutter reference is made to U.S. Pat. No. 5,102,268, incorporated herein by reference.

Various adjustment devices have been designed with means for adjusting the position of a cutting insert relative to the cutter body. For example, see U.S. Pat. Nos. 5,800,079; 6,004,080 and 4,692,069, incorporated herein by reference.

Nonetheless, there remains a need for an improved device for making adjustments to the lateral position of cutting inserts mounted around a cutter body or other tool that is easier and simpler than prior art adjusting devices. Ideally, such an adjusting device would be able to withstand the harsh operating environment encountered during a machining operation.

SUMMARY OF THE INVENTION

Generally speaking, the invention is directed to a cutting tool that overcomes one or more shortcomings associated with the prior art. To this end, the cutting tool comprises a cutter body having at least one pocket therein. The pocket is adapted to receive a cutting insert cartridge. A position-adjusting device comprises an eccentric protrusion engaging the cartridge. The device is displaceable in opposing directions to displace the protrusion to cause movement of the cartridge in opposing directions.

The invention is also directed to a cutting tool comprising a cutter body having at least one pocket therein and a bore in communication with the pocket. The pocket has a cartridge therein. The cartridge supports a cutting insert. In an alternate embodiment the cartridge and insert may be formed as a unitary member, or a cutting edge of, for example, polycrystalline diamond, may be formed directly on the cartridge.

In a preferred embodiment of the invention, the position-adjusting device comprises a body member, for example a cylindrical body member, supported in a fixed axial relation in the bore. The eccentric protrusion extends from the cylindrical body member. The cylindrical body member is displaceable in opposing directions to displace the protrusion and move the cartridge in opposing directions.

The cylindrical body member is in a fixed axial relation within the bore in the cutter body. The cylindrical body member has an end from which extends an eccentric protrusion. The protrusion engages a slot in a rear surface of the cartridge. The cylindrical body member is rotatable in opposing directions to displace the protrusion in the slot and move the cartridge in opposing directions.

In one embodiment of the invention, a clamping wedge is provided in the pocket for clamping the cartridge in the pocket. In an alternate embodiment, the clamping wedge may be omitted and the cartridge can be secured to the pocket directly by a fastener which passes, for example, through a bore through the cartridge into the cutter body.

Advantageously, the cutting tool is provided with an adjustment device that is easily and highly controllable for fine position adjustments of a cartridge which may be used independently of any other means for adjustment.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
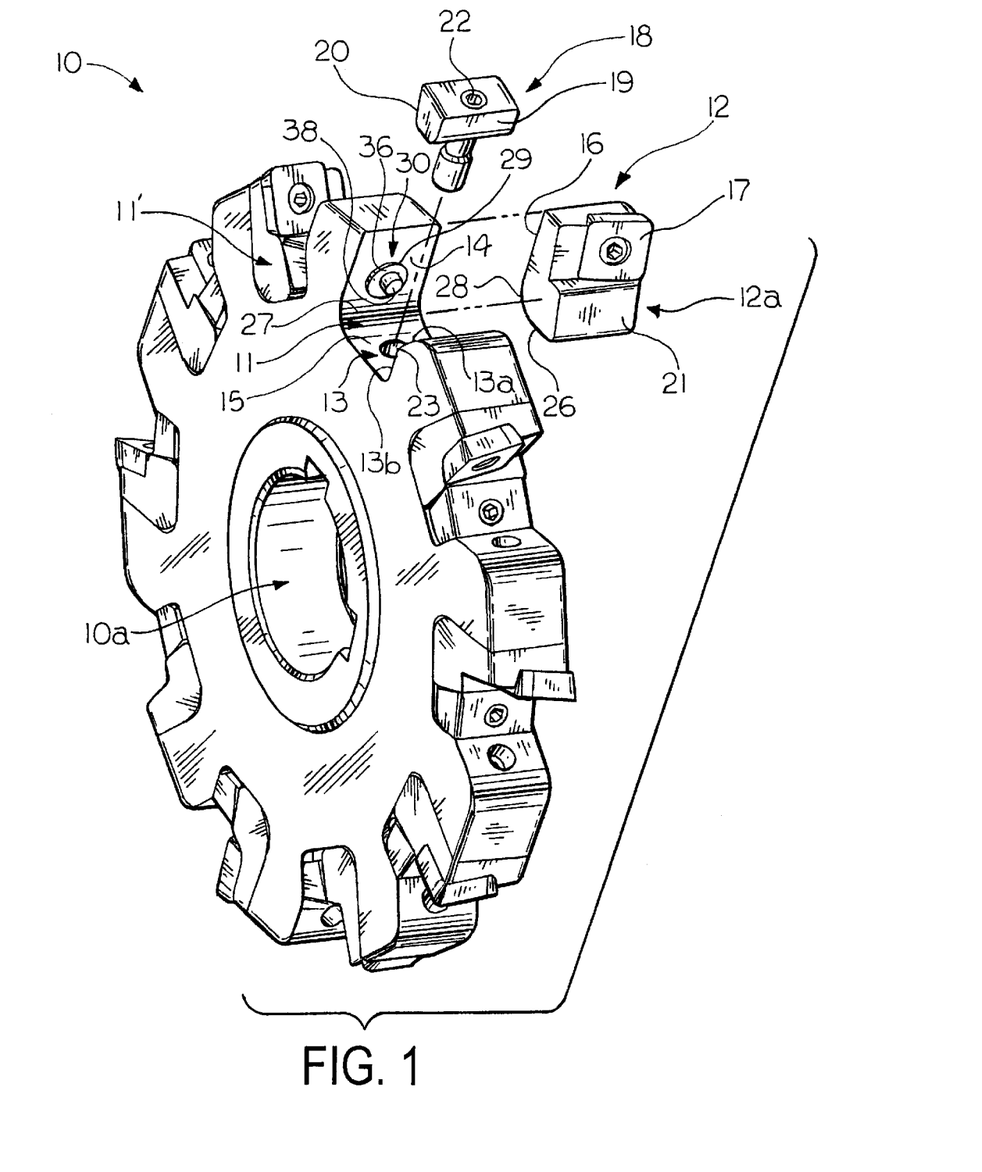
FIG. 1 is a partially exploded front perspective view of a cutting tool that includes insert cartridge adjusting devices of the invention.
Figure 2:
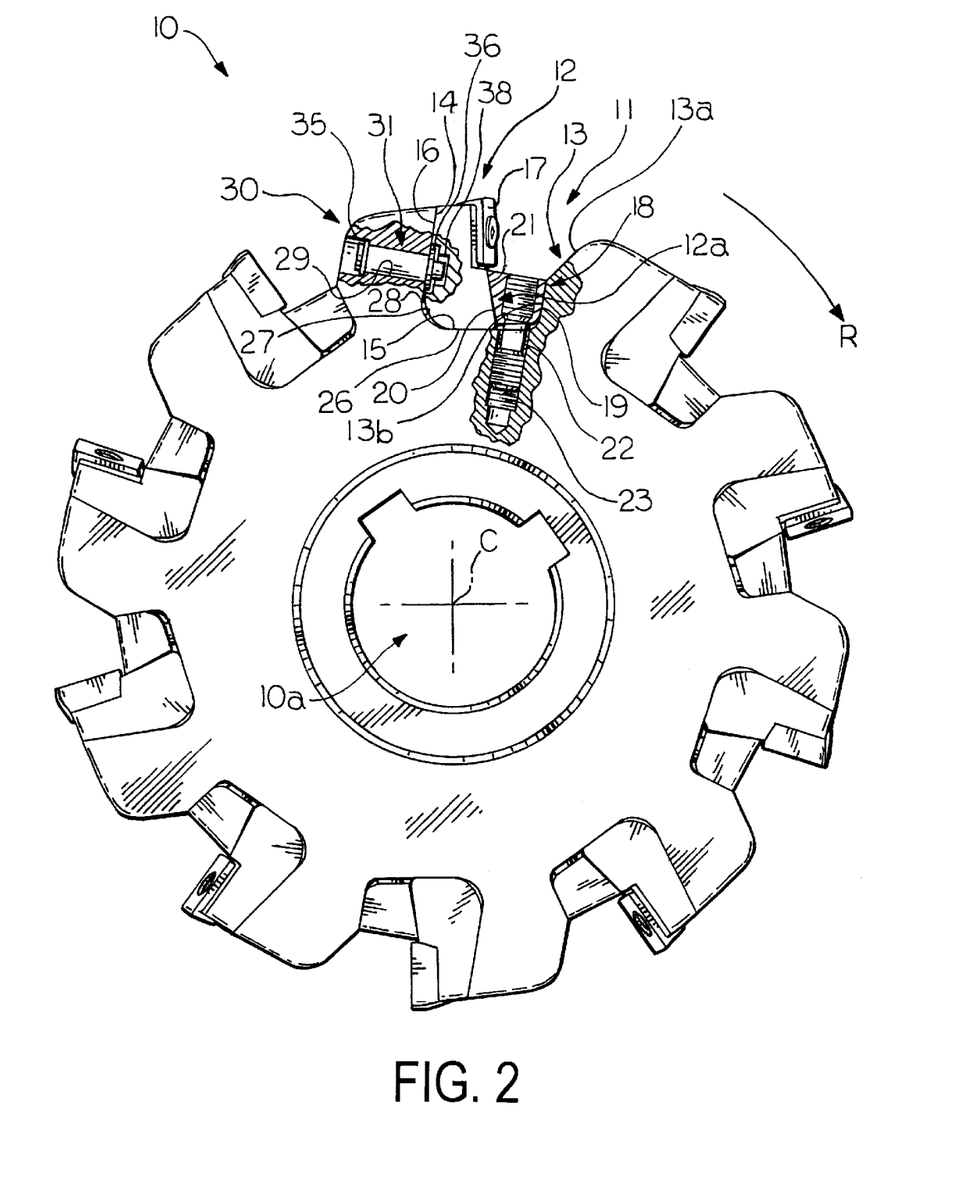
FIG. 2 is a partial cutaway side elevational view of the cutting tool illustrated in FIG. 1 with some insert cartridge adjusting devices and wedge screws shown in full.
Figure 3:
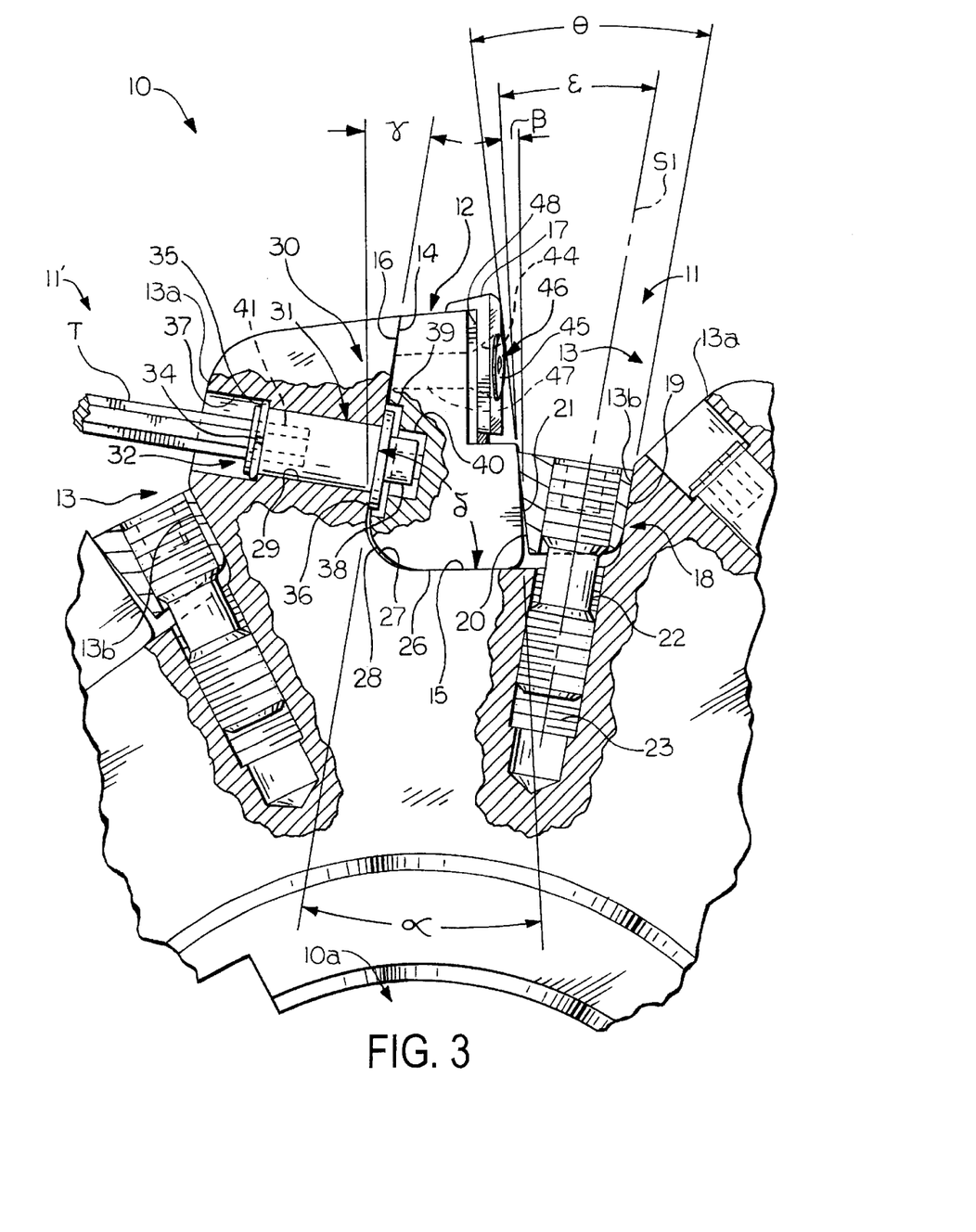
FIG. 3 is an enlarged partial cutaway side elevational view of the cutting tool illustrated in FIGS. 1 and 2.

With reference now to FIGS. 1–3, wherein like numerals designate like components throughout all of the several figures, a cutter body of a rotary milling cutter or slotter is denoted by reference numeral 10. The cutter body 10 has a central core portion 10a and a plurality of circumferentially spaced, radially outwardly open recesses or cartridge pockets 11 located in an outer periphery of the body 10. The cartridge pockets 11 are provided for the receipt of partially wedge-shaped cartridges 12 (i.e., insert cartridges). The width of each cartridge 12 (i.e., the dimension parallel to a central axis C (shown in FIG. 2) of rotation of the body 10) is in one embodiment less than the width of the milling cutter body 10 or, in a preferred embodiment equivalent to the entire width of the milling cutter body 10.

A radially inner wedge-shaped portion of the cartridge is denoted by numeral 12a (shown in FIG. 2). The milling cutter body 10 is arranged for rotation around the central axis C in direction R (i.e., in a clockwise direction when viewing FIG. 2). The cartridge pockets 11 are evenly distributed along the periphery of the cutter body 10. In the embodiment shown, ten cartridge pockets 11 are provided. It is to be understood, however, that the cartridge pockets 11 in certain cases can be unevenly distributed around the periphery of the milling cutter body. Moreover, a greater or lesser number of cartridge pockets 11 can be provided.

A leading or forward wall 13 of each cartridge pocket 11, as seen in the rotary direction R, comprises two surfaces 13a and 13b. The surfaces 13a and 13b may be arranged at an angle relative to each other or the surfaces 13a and 13b may be coplanar. A trailing or rearward wall 14 of the cartridge pocket 11 has a generally flat surface. A bottom of the cartridge pocket 11 is defined by a bottom wall 15, which extends between the forward and rearward walls 13 and 14. The rearward wall 14 of the cartridge pocket 11 is adapted to engage a rear surface 16 of the cartridge 12. The bottom wall 15 of the cartridge pocket 11 is arranged at an angle greater than 90 degrees relative to a radially inner surface 13b of the forward wall 13 of the cartridge pocket 11. The bottom wall 15 is oriented at an angle δ (shown in FIG. 3) less than 90 degrees relative to the rear wall 14 of the same cartridge pocket 11.

A clamping means for the cartridge 12 is in the form of a clamping wedge 18 arranged radially inward of a cutting edge of an insert 17 when the insert is seated on the cartridge 12. A leading or forward wedge surface 19 of the wedge 18 (with reference to the rotary direction R) is arranged in abutment with the radially inner surface 13b of the forward wall 13 of the cartridge pocket 11. A trailing or rear wedge surface 20 of the wedge 18 is arranged in abutment with a leading or front surface 21 of the cartridge 12. The wedge 18 is displaced along the surface 13b of the forward wall 13 of the cartridge pocket 11 upon tightening a fastener such as a threaded clamp screw 22. The screw 22 is threadably engaged in a corresponding threaded bore 23 in the cartridge pocket 11. The bore 23 can extend all the way through to the core portion 10a of the cutter body 10. The clamp screw 22 is provided with right hand threads along the bottom of the screw and left hand threads along the top of the screw so that the clamp wedge 18 can be positively displaced in both the clamping and unclamping directions (i.e., in opposing radial directions when viewing FIG. 1) as the clamp screw is threaded or unthreaded within the block. Loosening of the cartridge 12 is accomplished by an unscrewing of the clamp screw 22.

The bottom surface 26 of the cartridge 12 is shaped to correspond with the bottom wall 15 of the cartridge pocket 11. When the cartridge 12 is installed in the cartridge pocket 11, the bottom wall 15 of the cartridge pocket 11 engages the bottom surface 26 of the cartridge 12. In a preferred embodiment, in order to reduce stress sustained by the cartridge 12 during rotation of the cutter body 10 and the cutting process, the rearward and bottom walls 14 and 15 of the cartridge pocket 11 and the rear and bottom surfaces 16 and 26 of the cartridge 12 intersect at rounded corners 27 and 28. The radii of the corners 27 and 28 are limited by intrusion of a thru-bore 29 that extends through the cutter body 10. The bore 29 extends between the rearward wall 14 of the cartridge pocket 11 and a radially outer surface 13a of the forward wall 13 of a trailing cartridge pocket 11'. In a preferred embodiment, the bore 29 is oriented perpendicularly to the plane of the rearward wall 14 of the cartridge pocket 11.

Figure 4:
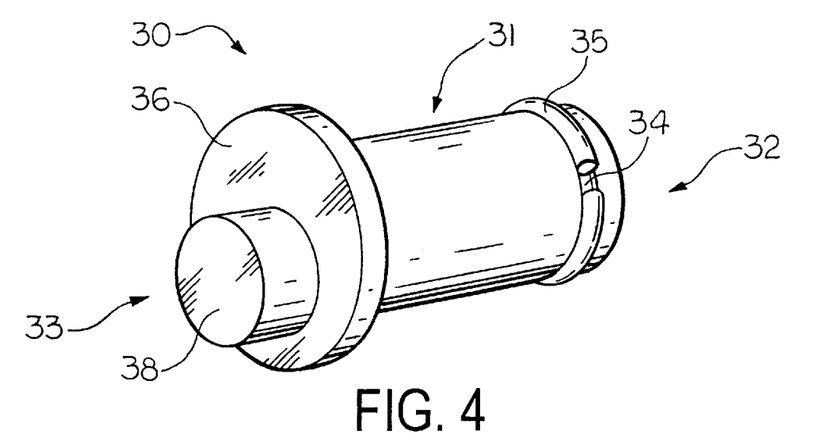
FIG. 4 is an enlarged front perspective view of the insert cartridge adjusting device illustrated in FIGS. 1–3.
Figure 5:
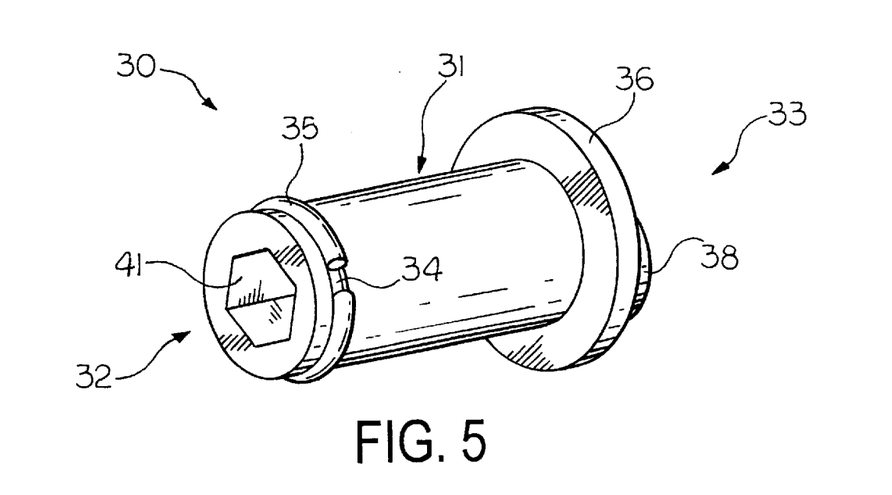
FIG. 5 is a rear perspective view of the insert cartridge adjusting device illustrated in FIG. 4.

The thru-bore 29 supports an adjustment device for mechanically adjusting the relative position of the cartridge in opposing directions with respect to the cutter body. As illustrated in FIGS. 4 and 5, the adjustment device comprises a cam device 30 having a body member 31. The body member 31 is not threaded such that displacement of the cylindrical body 31 along its axis is not encouraged. In a preferred embodiment the body member 31 is cylindrical. The body member 31 has two opposing ends 32 and 33. An annular groove 34 is provided proximate one end 32 of the body member 31. A snap ring 35 is carried by the annular groove 34. A flange 36 is provided at an opposite end 33 of the body member 31 to restrain axial movement of the adjustment device within the bore 29. The through bore 29 is provided with a stepped radius 37 (shown in FIG. 3) nearest the forward wall 13 of the trailing cartridge pocket 11' to provide two concentric openings of varying diameters. The snap ring 35 engages a shoulder defined between the through bore 29 and the stepped radius 37 and the flange 36 engages the rearward wall 14 of the cartridge pocket 11. The snap ring 35 and the flange 36 prevent movement of the cylindrical body 31 along the axis of the bore 29.

Figure 6:
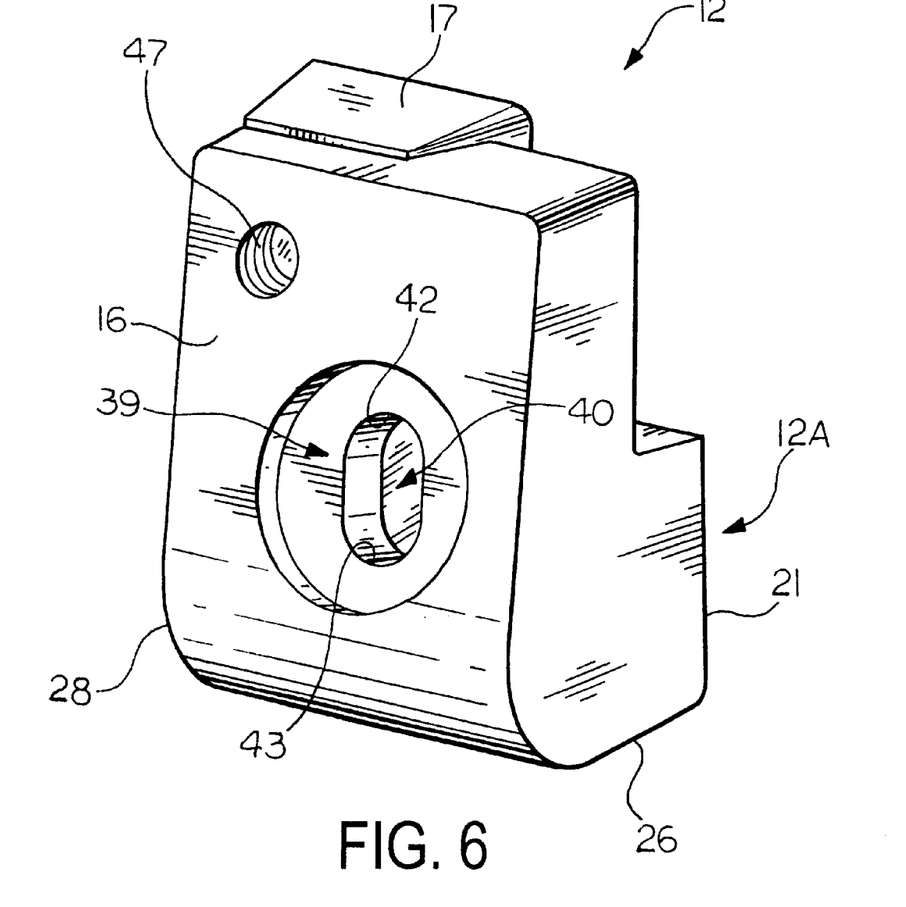
FIG. 6 is an enlarged rear perspective view of the insert cartridge illustrated in FIGS. 1–3.

As shown in FIGS. 4 and 5, the cam device 30 has an eccentric protrusion 38 extending from the end 33 of the cylindrical body 31 supporting the flange 36. The eccentric protrusion 38 is preferably cylindrical in shape. However, the protrusion 38 may be of most any suitable shape to engage the cartridge 12. More particularly, the rear surface 16 of the cartridge 12 has a recess 39 therein (as illustrated in FIG. 6) for receiving the flange 36 and a radially extending slot 40 therein for receiving the protrusion 38. The end 32 of the cylindrical body 31 supporting the snap ring 35 has a tool engaging recess 41. The tool engaging recess 41 is adapted to receive a tool T (shown in FIG. 3). The tool T is provided for rotating the cylindrical body 31 about its axis of rotation to axially displace the cartridge 12, i.e., to displace the cartridge 12 along a line parallel to the central axis C of the cutter body 10. The recess 39 in the rear surface 16 of the cartridge 12 has a larger dimension than the flange 36 to permit the cylindrical body 31 to rotate and the eccentric protrusion 38 to travel in the slot 40.

Figure 7A:
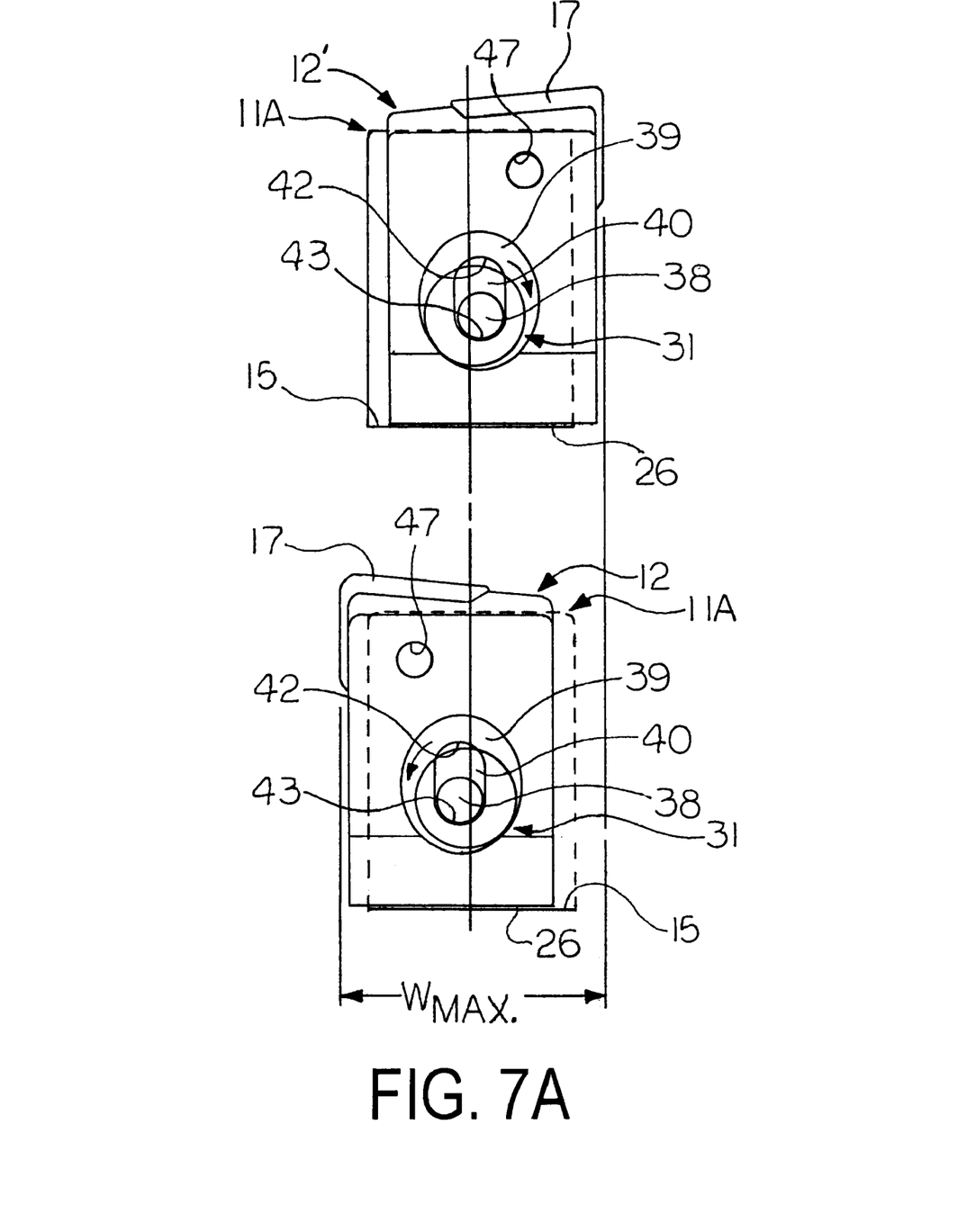
FIGS. 7A through 7C are enlarged diagrammatic representations of the adjusting devices and succeeding right and left insert cartridges of the cutting tool illustrated in FIG. 1 showing the insert cartridges in three different positions.
Figure 7B:
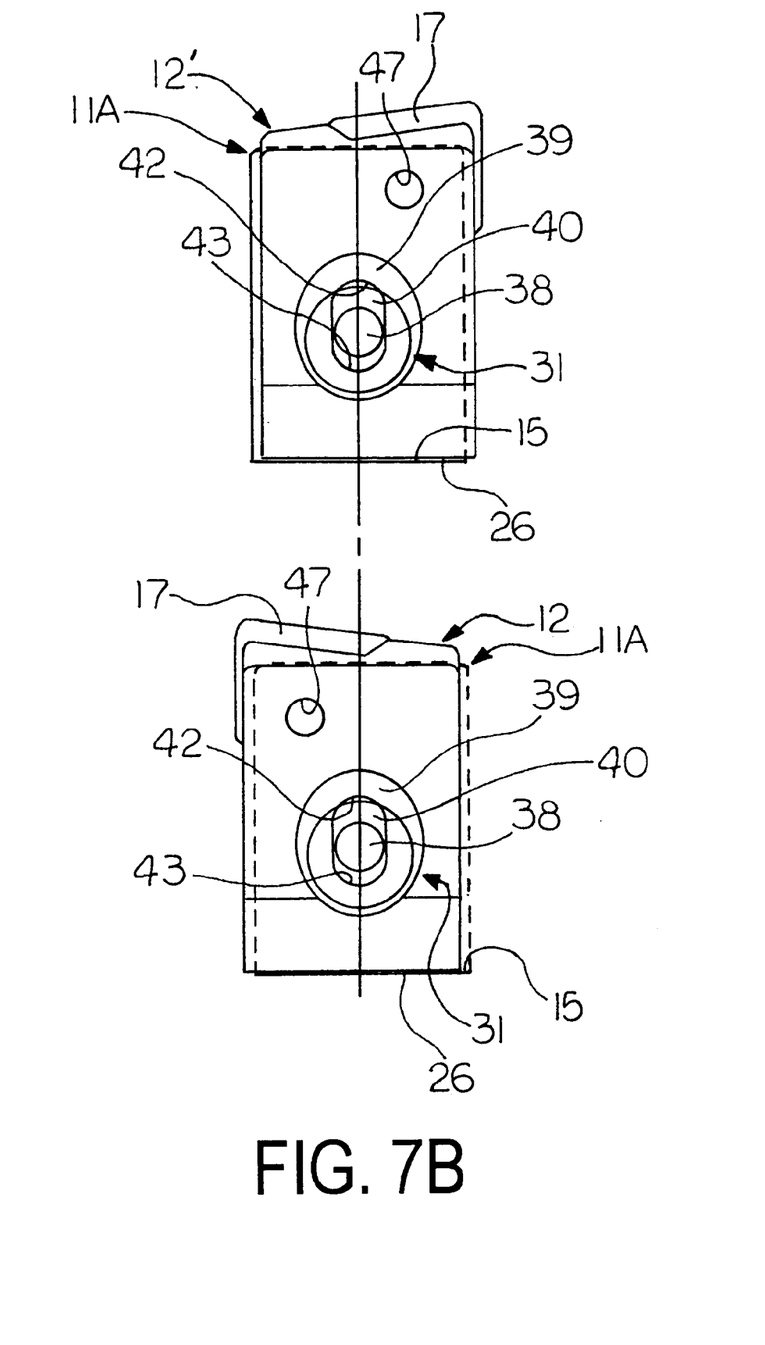
Figure 7C:
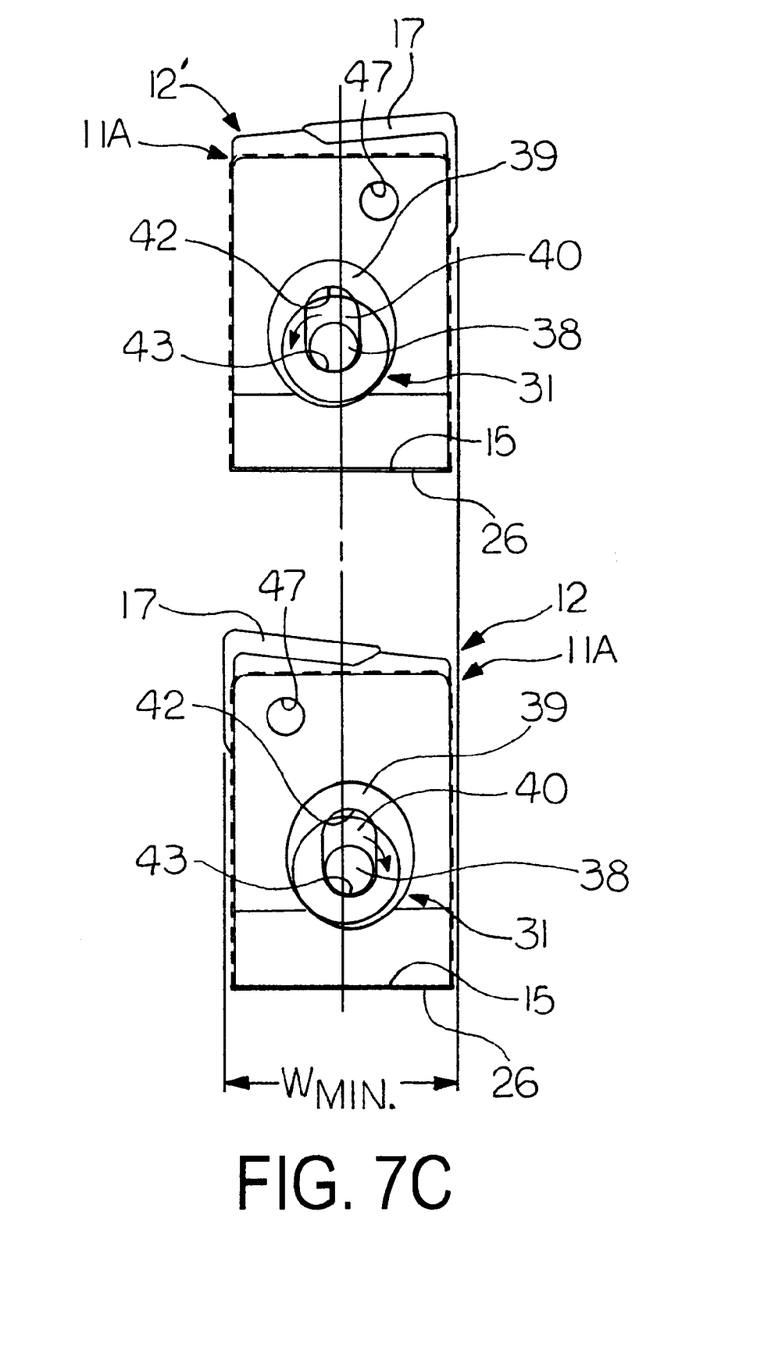

The cylindrical body 31 is preferably adapted to rotate less than 360 degrees. In a preferred embodiment of the invention, the cylindrical body 31 is adapted to rotate about 180 degrees. Rotation of the cylindrical body 31 can be limited by orienting the slot 40 in the rear surface 16 of the cartridge 12 so that the protrusion 38 of the cam device 30 can pass through only a radially outer end 42 of the slot 40 (e.g., the top end when viewing FIG. 7B). The slot 40 is sufficiently long or large to provide clearance between the protrusion 38 and the radially outer end 42 of the slot 40. This prevents the protrusion 38 from engaging the radially outer end 42 of the slot 40 and displacing the cartridge 12 in a radial direction (i.e., in an upward direction when viewing FIGS. 7A and 7C) when the cylindrical body 31 is rotated. When the cylindrical body 31 is completely rotated in one direction or another, the protrusion 38 engages a radially inner end 43 of the slot 40 to push the cartridge 12 radially inward into the cartridge pocket 11 (as illustrated in FIGS. 7A and 7C). The resultant cam device 30 is adapted to move the cartridge 12 in opposite or opposing directions (i.e., laterally back and forth, or from right to left, or vice versa, when viewing FIGS. 7A through 7C) totally independent of any other manual displacement.

A radially outer portion of the cartridge 12 should, in a conventional manner, be provided with a seat or insert pocket for the location of the cutting insert 17. As shown in FIG. 3, the insert 17 is in this case provided with a central aperture 44 for the receipt of the conical head 45 of a centrally provided clamp screw 46 which is threadably engaged in a correspondingly threaded bore 47 in the cartridge 12. The central aperture 44 of the insert 17 has a decreasing cross-section towards a bottom surface 48 of the insert 17. The head of the clamp screw 46 should be pre-loaded, in a conventional manner, to locate the insert 17 in the insert pocket when tightening the clamp screw 46.

The cartridges 12 could, at different positions around the milling cutter body 10, be provided with inserts 17 located in different orientations, such as shown in FIGS. 1–3. It should be appreciated by one skilled in art that based upon the foregoing, the inserts 17 could be located in orientations different than those illustrated. It should further be appreciated that the inserts 17 could also be indexable (i.e., the inserts 17 could be rotated and/or flipped over to expose different cutting edges). One common feature of all these cartridges 12 is that the insert 17 has a central aperture 44 for the receipt of a clamp screw 46 engaging therein. It will also be appreciated that the insert and cartridge may be formed as a unitary construction.

As shown in FIG. 3, the wedge-shaped portion 12a of the cartridge 12 is provided with a cartridge angle a that is the sum of the angles of the front and rear surfaces 21 and 16 of the cartridge 12. For example, the front surface 21 of the cartridge 12 may be provided with an angle $\beta$ in the range of 0 degrees to 20 degrees, and preferably about 8 degrees. The rear surface 16 of the cartridge 12 may be provided with an angle $\gamma$ in the range of 5 degrees to 45degrees, and preferably about 9 degrees. The resultant cartridge angle $\alpha$ is in the range of 5 degrees to 65 degrees, and preferably about 17 degrees. The resultant shape of the wedge-shaped portion 12a is that of a dovetail, which helps prevent the cartridge 12 from escaping radially from the cartridge pocket 11.

Note that the angle $\delta$ between the rearward wall 14 and the bottom wall 15 of the cartridge pocket 11 is an acute angle. The angle $\delta$ is in the range of 45 degrees to 89 degrees, and preferably about 80 degrees. This is to insure that the cartridge 12 will also be driven radially inward and rearward into the cartridge pocket 11.

A gap should be provided between the cartridge 12 and cutter body pocket 11 near a radially inward portion of the rear surface 16 of the cartridge 12. If the angle $\gamma$ of the rear surface 16 of the cartridge 12 is about 9 degrees and the angle $\delta$ of the rearward wall 14 of the cartridge pocket 11 is about 80 degrees relative to the bottom wall 15 of the cartridge pocket 11, a gap will be provided between the radially inward portion of the rear surface 16 of the cartridge 12 and cutter body pocket 11. The gap should be continued into the radii of the rounded corners 27 and 28 between the rearward and bottom walls 14 and 15 of the cartridge pocket 11 and the rear and bottom surfaces 26 of the cartridge 12. This could be accomplished if the radius of the corner 27 between the rearward and bottom walls 14 and 15 of the cartridge pocket 11 is smaller than the radius 28 between the rear and bottom surfaces 16 and 26 of the cartridge 12. This gap is to assure that the radially outward portion of surface 16 of the cartridge 12 always makes contact with the radially outward portion of surface 14 of the cartridge pocket 11.

Continuing with FIG. 3, there is illustrated a gap between the front surface 21 of the cartridge 12 and a radially inward portion of the rear wedge surface 20. This insures that a radially outward portion of the clamping wedge 18 engages the front surface 21 of the cartridge 12 to drive the cartridge 12 radially inward and rearward into the cartridge pocket 11. To this end, the central axis $S_1$ of the clamp screw 22 should not be radially oriented in relation to the central axis C of rotation of the cutter body 10. The central axis $S_1$ should be parallel to the plane of the forward wedge surface 19. The front surface 21 of the cartridge 12 forms an acute angle $\epsilon$ with the central axis $S_1$ and the plane of the forward wedge surface 19. The angle $\epsilon$ is in the range of 5 degrees to 65 degrees, and preferably about 18 degrees. As stated above, the resultant wedge angle $\theta$ is preferably about 17 degrees. The disparity in the two angles $\epsilon$ and $\theta$ provides a gap between the front surface 21 of the cartridge 12 and the radially inward portion of the rear wedge surface 20.

In operation, the clamp screw 22 of the clamping wedge 18 is loosened to loosen the clamping wedge 18 sufficiently to adjust the cartridge 12 in the cartridge pocket 11. With the clamping wedge 18 loosened, the cam device 30 may adjust the position of the cartridge 12 by rotating the cylindrical body member 31 accordingly. The cutter body 10 may support left-handed cartridges 12 (at the top when viewing FIGS. 7A through 7C) and right-handed cartridges 12 (at the bottom when viewing FIGS. 7A through 7C). When the cylindrical body member 31 at the top of FIG. 7A is rotated completely in a clockwise direction, the left-handed cartridge 12' is at its maximum cutting position (i.e., to the right when viewing FIG. 7A). Similarly, when the cylindrical body member 31 at the bottom of FIG. 7A is rotated completely in a counter-clockwise direction, the right-handed cartridge 12 is at its maximum cutting position (i.e., to the left when viewing FIG. 7A). In these positions, the two cartridges 12' and 12 can cooperatively cut a maximum width slot $W_{MAX}$. Conversely, when the cylindrical body member 31 at the top of FIG. 7C is rotated completely in a counter-clockwise direction, the left-handed cartridge 12' is at its minimum cutting position (i.e., to the left when viewing FIG. 7C). Similarly, when the cylindrical body member 31 at the bottom of FIG. 7C is rotated completely in a clockwise direction, the right-handed cartridge 12 is at its minimum cutting position (i.e., to the right when viewing FIG. 7C). In these positions, the two cartridges 12' and 12 can cooperatively cut a minimum width slot $W_{MIN}$. In FIG. 7B, the cylindrical bodies 31 are rotated so that the eccentric protrusion 38 is located at top dead center. In these positions, the cartridges 12' and 12 are moved to a position intermediate the minimum and maximum cutting positions shown in FIGS. 7A and 7C.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

The documents, patents and patent applications referred to herein are hereby incorporated by reference.

What is claimed is:

1. A cutting tool comprising:

a cutter body having at least one pocket therein adapted to receive a cutting insert cartridge, the cutting insert cartridge including a slot in communication with a bore in the cutter body; and a position-adjusting device axially fixed and rotatably moveable with respect to the bore and including a body member and an eccentric protrusion extending from the body member, the eccentric protrusion engaging the slot of the cartridge, wherein the device is rotatable to cause the eccentric protrusion to displace the cartridge with respect to the cutter body;

wherein the eccentric protrusion engages a slot in the cartridge dimensioned to limit rotation of the device, the device being rotatable in opposing directions to displace the protrusion within the slot to cause movement of the cartridge.

2. The cutting tool of claim 1 wherein the position-adjusting device comprises a cylindrical body member in a bore in the cutter body and an eccentric protrusion engaging a slot in the cartridge, the cylindrical body member being rotatable in opposing directions to displace the protrusion to cause movement of the cartridge.

3. The cutting tool of claim 2, wherein the cylindrical body member is held in a fixed axial relation to the bore by a spring ring and a flange.

4. The cutting tool of claim 2, wherein the slot is dimensioned to limit rotation of the device.

5. A cutting tool comprising:
   a cutter body having at least one pocket therein and a bore in communication with the pocket;
   a cartridge in the pocket, the cartridge supporting a cutting insert; and
   a cylindrical body member supported in a fixed axial relation in the bore, the cylindrical body member having an eccentric protrusion extending therefrom, the protrusion engaging the cartridge, the cylindrical body member being displaceable in opposing directions to displace the protrusion and move the cartridge in opposing directions;
   wherein the cartridge includes a slot dimensioned to limit displacement of the device.

6. The cutting tool of claim 5, wherein the slot is dimensioned to limit displacement of the device to about 180 degrees.

7. The cutting tool of claim 5, wherein the cylindrical body member is held in fixed axial relation to the bore by a spring ring supported by the cylindrical body member at a first end of the bore and a flange supported by the cylindrical body member at a second end of the bore.

8. The cutting tool of claim 7, wherein the cartridge further has a recess for receiving the flange.

9. A cutting tool comprising:
   a cutter body having at least one pocket therein and a bore in communication with the pocket;
   a cutting insert cartridge in the pocket;
   a clamping wedge in the pocket for clamping the cartridge in the pocket; and
   a cylindrical body member in a fixed axial relation within the bore, the cylindrical body member having an end from which extends an eccentric protrusion, the protrusion engaging a slot in a rear surface of the cartridge, the cylindrical body member being rotatable in opposing directions to displace the protrusion in the slot and move the cartridge in opposing lateral directions;
   wherein the cartridge includes a slot dimensioned to limit rotation of the device.

10. The cutting tool of claim 9, wherein the cylindrical body member is fixed in position in the pocket, the cartridge, and the slot are structured and dimensioned to limit rotation of the device to about 180 degrees.

11. The cutting tool of claim 9, wherein the cylindrical body member is held in fixed axial relation in the bore by a spring ring supported by the cylindrical body member at a first end of bore and a flange supported by the cylindrical body member at a second end of the bore.

12. The cutting tool at claim 11, wherein the rear surface of the cartridge further has a recess therein for receiving the flange.

13. The cutting tool of claim 9, wherein the cylindrical body member has a tool engaging end opposite the end from which the eccentric protrusion extends.

14. The cutting tool of claim 9, wherein a gap is provided between a lower portion of the cartridge and the pocket.

15. The cutting tool of claim 9, wherein a gap is provided between a lower portion of the cartridge and the clamping wedge.

* * * * *